US010457168B2

(12) United States Patent
Anderson et al.

(10) Patent No.: US 10,457,168 B2
(45) Date of Patent: Oct. 29, 2019

(54) CHILD SAFETY SEAT

(71) Applicant: Wonderland Switzerland AG, Steinhausen (CH)

(72) Inventors: Robert Scott Anderson, Narvon, PA (US); James M. F. Hutchinson, Mohnton, PA (US); Clyde V. Harmes, Mohnton, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 213 days.

(21) Appl. No.: 15/621,051

(22) Filed: Jun. 13, 2017

(65) Prior Publication Data
US 2017/0355287 A1  Dec. 14, 2017

Related U.S. Application Data

(60) Provisional application No. 62/349,927, filed on Jun. 14, 2016.

(51) Int. Cl.
*B60N 2/14* (2006.01)
*B60N 2/26* (2006.01)
*B60N 2/28* (2006.01)
(52) U.S. Cl.
CPC ......... *B60N 2/2806* (2013.01); *B60N 2/2812* (2013.01); *B60N 2/2821* (2013.01);
(Continued)
(58) Field of Classification Search
USPC ............. 297/256.12, 256.13, 256.14, 256.16
See application file for complete search history.

(56) References Cited

U.S. PATENT DOCUMENTS 6,746,080 B2 *  6/2004  Tsugimatsu .......... B60N 2/2806
                                              297/216.11
7,073,859 B1 *  7/2006  Wilson ................. B60N 2/0232
                                              297/250.1
(Continued)

FOREIGN PATENT DOCUMENTS

AU     2011200416 C1    8/2011
CN        1382602 A    12/2002
(Continued)

OTHER PUBLICATIONS

Search Report dated Nov. 30, 2017 of co-pending UK Patent Application No. 1709363.4.
(Continued)

*Primary Examiner* — Robert Canfield
(74) *Attorney, Agent, or Firm* — NZ Carr Law Office, PLLC

(57) ABSTRACT

A child safety seat includes a support base, a rotary platform and a child seat. The support base is suitable for placement on a vehicle seat and includes an anchoring portion and a bearing portion connected with each other, the anchoring portion having a belt path for passage of a fastening belt to attach the child safety seat on a vehicle seat. The rotary platform is pivotally connected with the bearing portion of the support base about a pivot axis. The child seat is connected with the rotary platform, wherein the child seat, the rotary platform and the bearing portion are movable in unison relative to the anchoring portion, and the child seat and the rotary platform are rotatable in unison as a seat unit relative to the support base between a plurality of positions including a forward facing position, a rearward facing position and a sideways facing position.

28 Claims, 11 Drawing Sheets

(52) U.S. Cl.
CPC ......... *B60N 2/2857* (2013.01); *B60N 2/2869* (2013.01); *B60N 2/2872* (2013.01); *B60N 2/2875* (2013.01); *B60N 2/2878* (2013.01); *B60N 2/2803* (2013.01); *B60N 2002/2818* (2013.01)

(56) References Cited

U.S. PATENT DOCUMENTS

| | | | | |
|---|---|---|---|---|
| 7,163,265 | B2 * | 1/2007 | Adachi | B60N 2/2806 297/250.1 |
| 8,419,129 | B2 * | 4/2013 | Inoue | B60N 2/2806 297/256.1 |
| 8,459,739 | B2 * | 6/2013 | Tamanouchi | B60N 2/2806 297/256.12 |
| 8,702,169 | B2 * | 4/2014 | Abadilla | B60N 2/062 297/256.12 |
| 2002/0145319 | A1 | 10/2002 | Tsugimatsu et al. | |
| 2006/0170262 | A1 * | 8/2006 | Gold | B60N 2/2869 297/256.12 |
| 2008/0054694 | A1 | 3/2008 | Lhomme et al. | |
| 2008/0054695 | A1 | 3/2008 | Lhomme | |
| 2010/0032997 | A1 | 2/2010 | Gold et al. | |
| 2011/0109138 | A1 | 5/2011 | Inoue et al. | |
| 2012/0261958 | A1 * | 10/2012 | Hutchinson | B60N 2/2806 297/250.1 |
| 2015/0336481 | A1 | 11/2015 | Horsfall | |
| 2017/0355284 | A1 * | 12/2017 | Hutchinson | B60N 2/2806 |
| 2018/0264977 | A1 * | 9/2018 | Anderson | B60N 2/2821 |

FOREIGN PATENT DOCUMENTS

| | | | |
|---|---|---|---|
| CN | 100448714 C | 1/2009 | |
| CN | 102143860 A | 8/2011 | |
| DE | 60212485 T2 | 6/2007 | |
| EP | 1077152 A2 | 2/2001 | |
| EP | 1247688 A1 | 10/2002 | |
| FR | 2930485 A1 * | 10/2009 | .......... B60N 2/2821 |
| FR | 2930485 A1 | 10/2009 | |
| GB | 2288328 A * | 10/1995 | .......... B60N 2/2854 |
| GB | 2424921 A | 11/2006 | |
| JP | 2008260510 A * | 10/2008 | .......... B60N 2/2821 |
| WO | WO-2007011342 A1 * | 1/2007 | .......... B60N 2/2821 |
| WO | 2015025432 A1 | 2/2015 | |
| WO | 2015027275 A1 | 3/2015 | |

OTHER PUBLICATIONS

Search Report in co-pending EP 17175643.0 dated Jul. 11, 2017.
Office Action in co-pending DE 102017113024.1 dated May 24, 2018; English Summary included as a separate document.
A Search Report issued by the State Intellectual Property Office of China dated Dec. 27, 2018 in connection with Chinese patent application No. 201710442015.7.

* cited by examiner

CHILD SAFETY SEAT

CROSS-REFERENCE TO RELATED APPLICATION(S)

This application claims the benefit of U.S. Provisional Application No. 62/349,927 filed on Jun. 14, 2016, the disclosure of which is incorporated herein by reference.

BACKGROUND

1. Field of the Invention

The present invention relates to child safety seats.

2. Description of the Related Art

A child safety seat is typically used in an automobile vehicle to properly restrain a child in the event of accidental collision. It is widely known that a child safety seat that is placed in a rear facing position can provide better protection, because it can distribute crash forces over a larger portion of the body (i.e., child's head and torso). Accordingly, safety experts and car seat manufacturers usually recommend to seat children in a vehicle in a rear facing configuration until the age of 2 years old. As the child grows older, the child safety seat then may be installed in a forward facing configuration.

The installation of the child safety seat usually requires securely attaching the child safety seat on the vehicle seat with a vehicle seatbelt or a latch belt separately provided. While the child safety seat is installed in the rearward facing position, it may be difficult to lift a child over a side of the child safety seat for seating the child in the seat. The installation would be even difficult due to the vehicle door jamb and roof, which may encourage parents to turn the child safety seat to the forward facing position sooner than recommended.

Therefore, there is a need for an improved child safety seat that allows convenient placement of a child, and can address at least the foregoing issues.

SUMMARY

The present application describes a child safety seat. The child safety seat includes a support base, a rotary platform and a child seat. The support base is suitable for placement on a vehicle seat and includes an anchoring portion and a bearing portion connected with each other, the anchoring portion having a belt path for passage of a fastening belt to attach the child safety seat on a vehicle seat. The rotary platform is pivotally connected with the bearing portion of the support base about a pivot axis. The child seat is connected with the rotary platform, wherein the child seat, the rotary platform and the bearing portion are movable in unison relative to the anchoring portion, and the child seat and the rotary platform are rotatable in unison as a seat unit relative to the support base between a plurality of positions including a forward facing position, a rearward facing position and a sideways facing position.

According to another embodiment, the child safety seat includes a support base suitable for placement on a vehicle seat, the support base including a first and a second flange portion vertically spaced apart from each other, the second flange portion being located below the first flange portion, a rotary platform pivotally connected with the support base about a pivot axis, and a child seat connected with the rotary platform, the child seat and the rotary platform being rotatable in unison as a seat unit relative to the support base between a plurality of positions including a forward facing position, a rearward facing position and a sideways facing position. The seat unit comprised of the child seat and the rotary platform is engaged with the first flange portion in the forward facing position with the first flange portion located adjacent to a shoulder support region of the child seat, and the seat unit is engaged with the second flange portion and disengaged from the first flange portion in the rearward facing position.

DETAILED DESCRIPTION OF THE EMBODIMENTS

Figure 1:
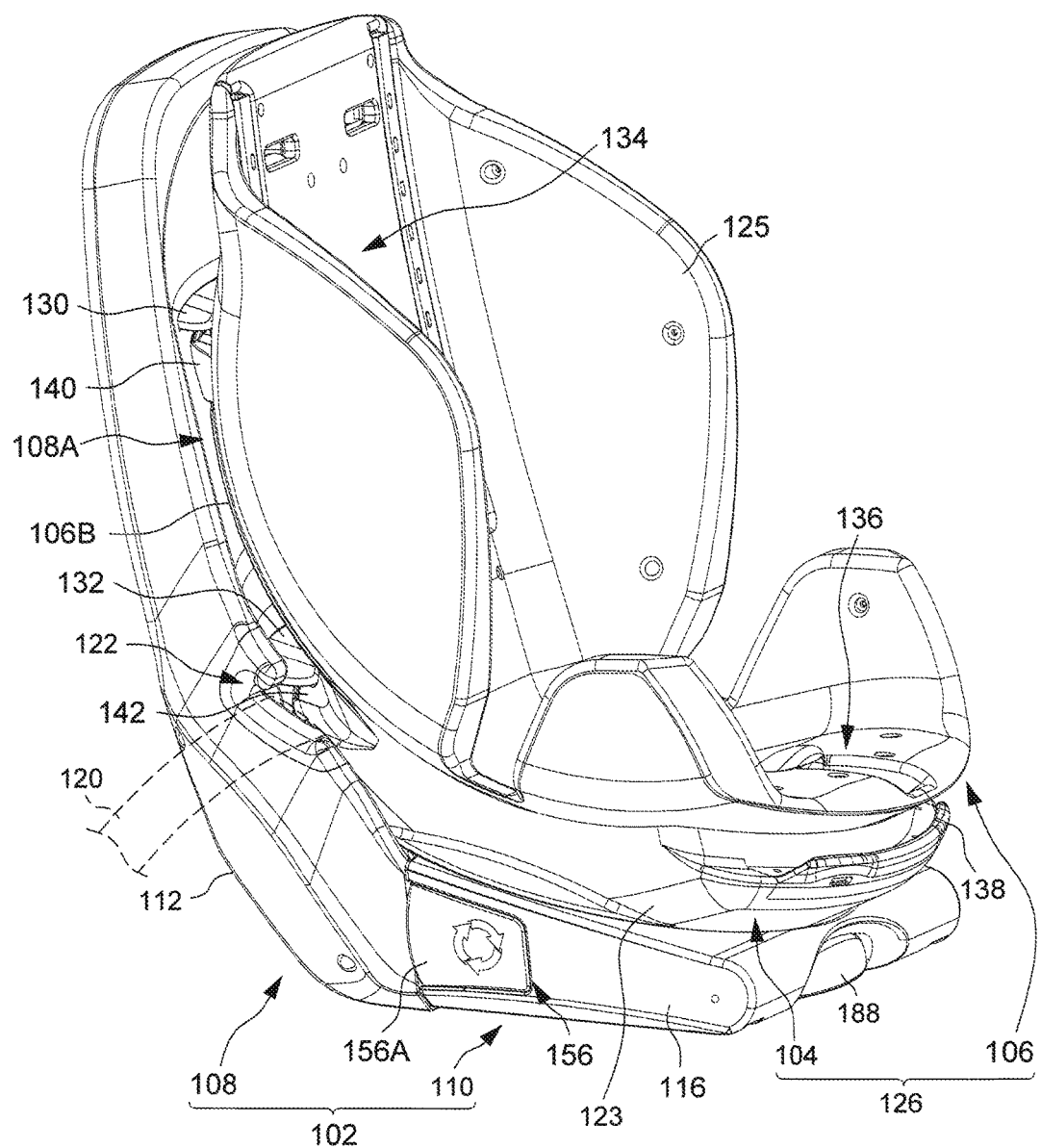
FIG. 1 is a perspective view illustrating an embodiment of a child safety seat in a forward facing position.
Figure 2:
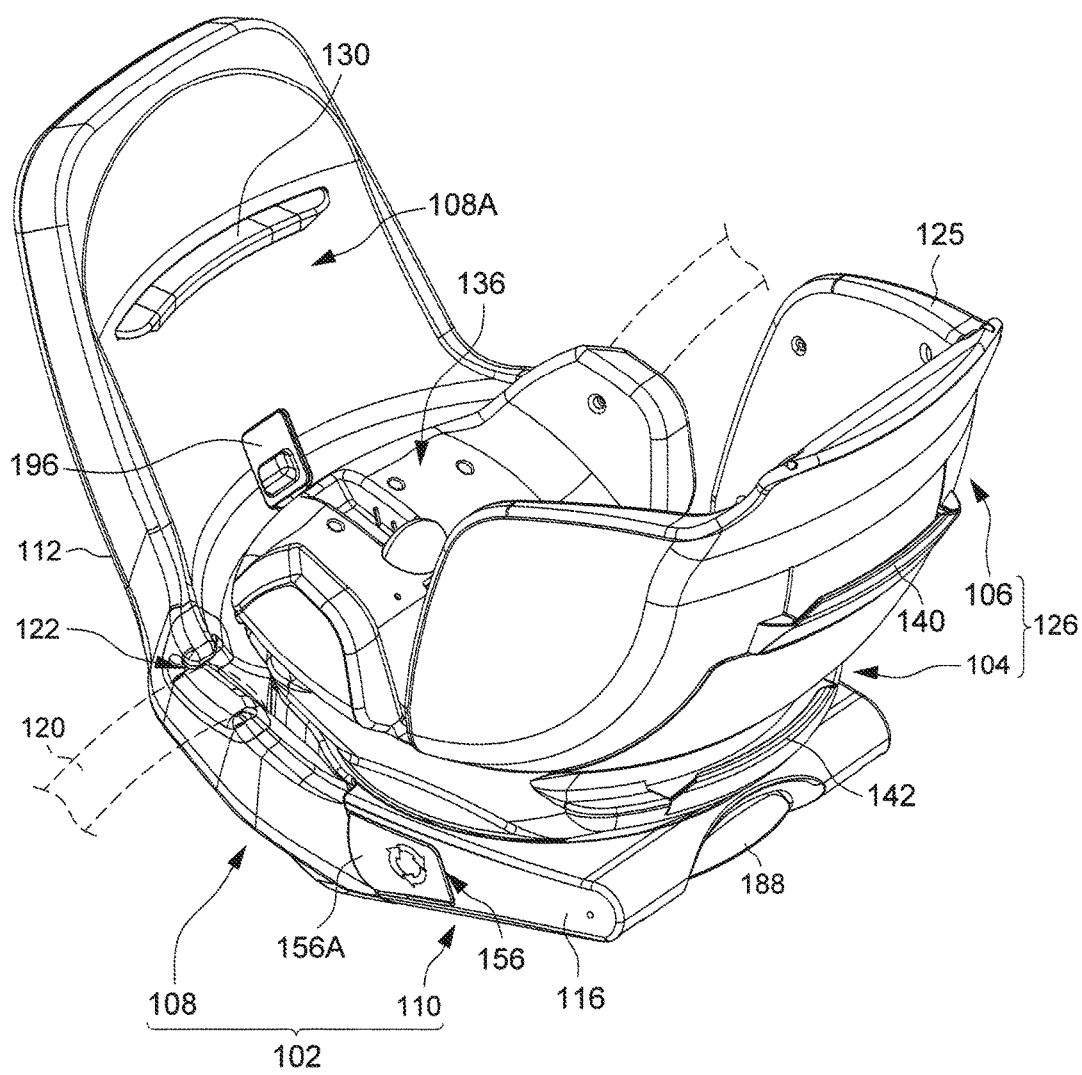
FIG. 2 is a perspective view illustrating the child safety seat in a rearward facing position.
Figure 3:
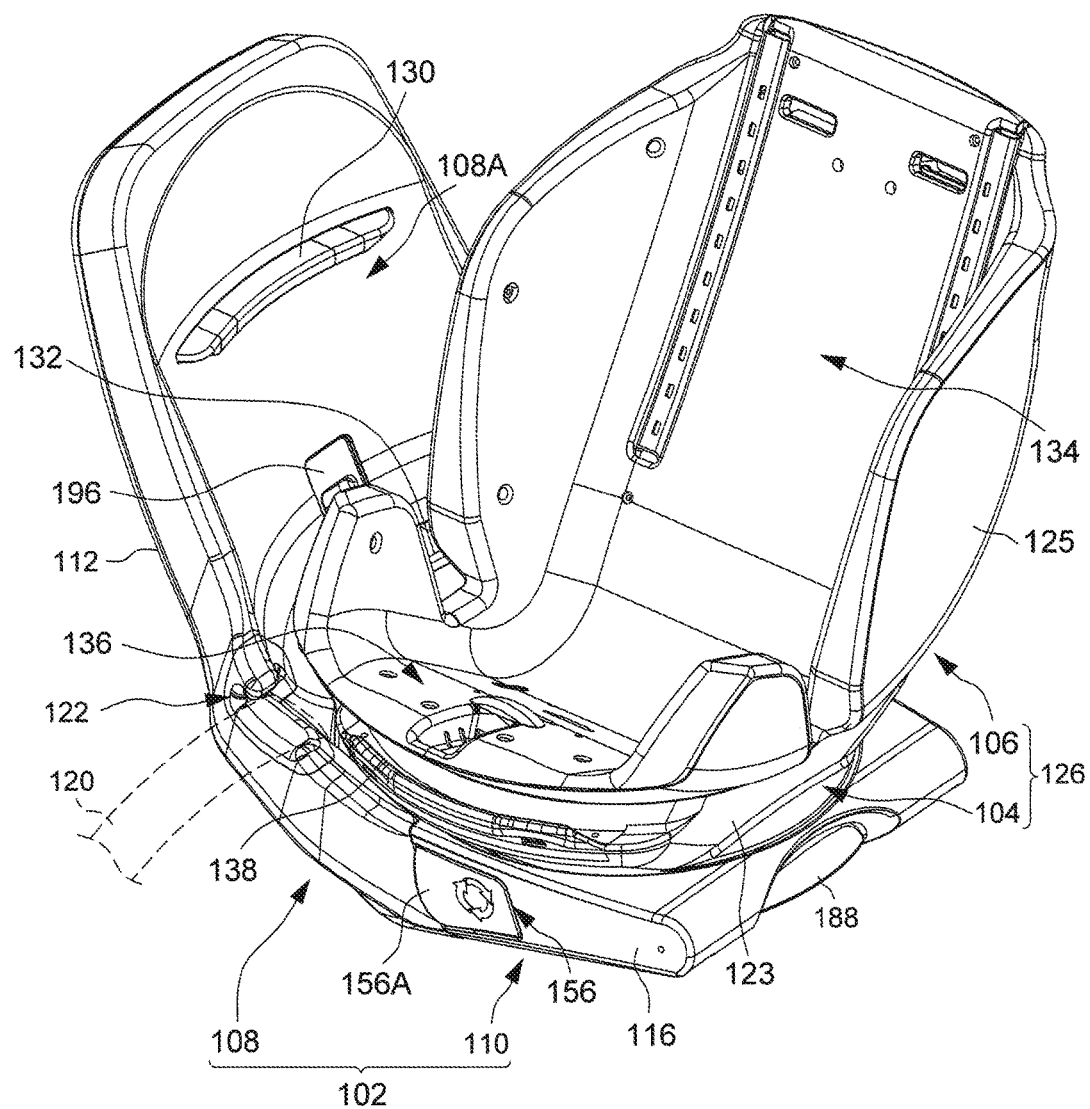
FIG. 3 is a perspective view illustrating the child safety seat in a sideways facing position.
Figure 4:
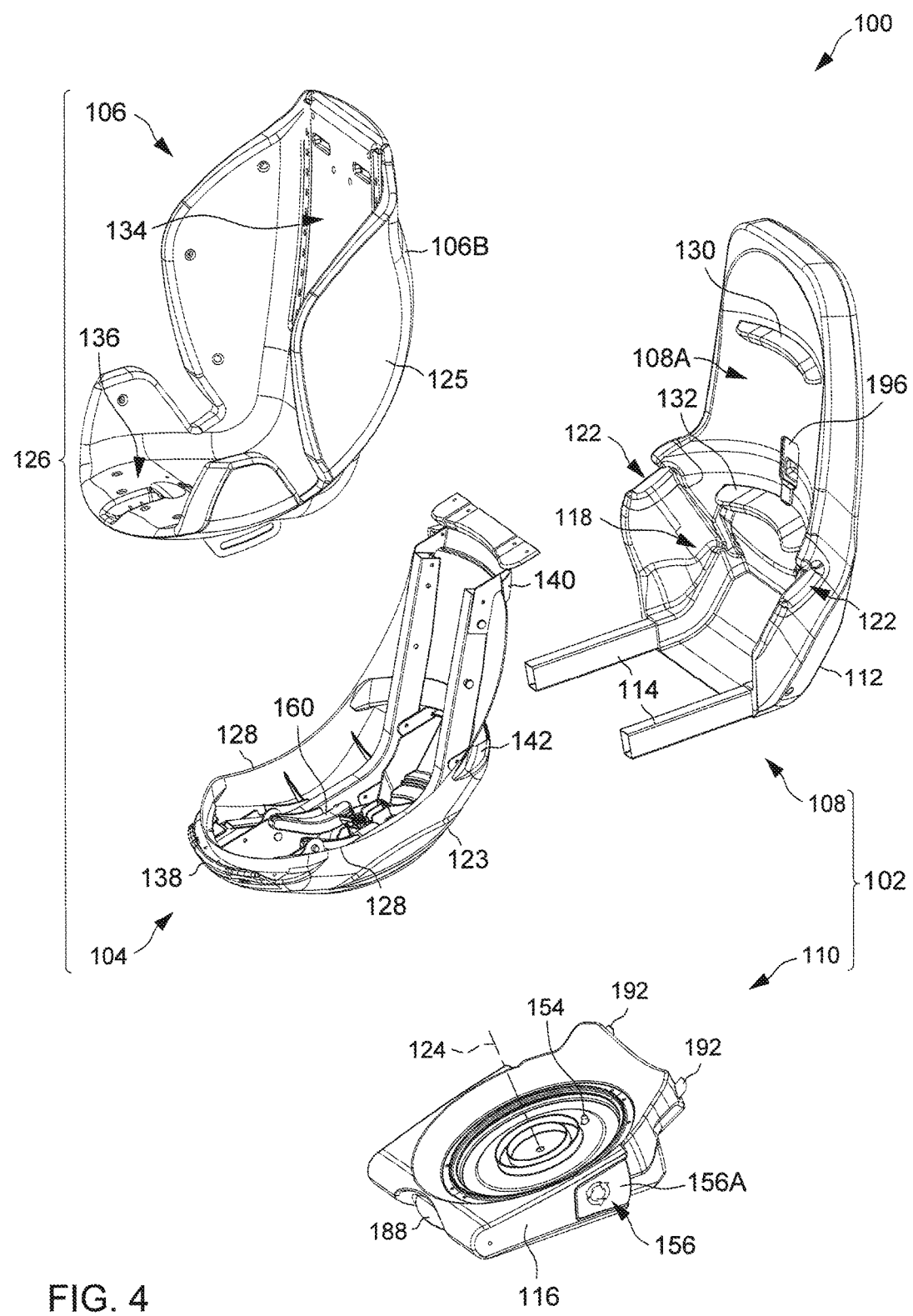
FIG. 4 is an exploded view illustrating a construction of the child safety seat.

FIGS. 1-3 are perspective views illustrating an embodiment of a child safety seat 100 in different positions, and FIG. 4 is an exploded view illustrating a construction of the child safety seat 100. Referring to FIGS. 1-4, the child safety seat 100 includes a support base 102, a rotary platform 104 and a child seat 106. The support base 102 is suitable for placement on a vehicle seat to provide stable support for the child safety seat 100. According to an example of construction, the support base 102 can include an anchoring portion 108 and a bearing portion 110 connected with each other. The anchoring portion 108 can include a rigid shell body 112 and two parallel rods 114 projecting forward from the shell body 112. The bearing portion 110 can include a rigid shell body 116, and can be assembled with the anchoring portion 108 by connecting shell body 116 with the two rods 114. The anchoring portion 108 can thereby have an upper part 108A extending above the bearing portion 110 at a rear of the bearing portion 110. The child safety seat 100 can be installed on a vehicle seat with the anchoring portion 108 (in particular the upper part 108A thereof) abutting against a seatback of the vehicle seat, the upper part 108A of the anchoring portion 108 rising generally along the seatback of the vehicle seat.

Moreover, the anchoring portion 108 can define a belt path 118 for passage of a fastening belt 120 (shown with phantom lines in FIGS. 1 and 2) to attach the child safety seat 100 on a vehicle seat. According to an example of construction, the belt path 118 can be comprised of two guide slots 122 formed through a left and a right sidewall of the anchoring portion 108, and extend transversally across the anchoring portion 108. A fastening belt 120, which may be a vehicle safety belt or a latch belt, can be disposed through the two guide slots 122 and stretched transversally across the support base 102 for securely attaching the support base 102 on a vehicle seat.

The rotary platform 104 can be comprised of a rigid shell body 123, e.g., made of a plastic material, which can have an upper surface for receiving the child seat 106. The rotary platform 104 is disposed on the support base 102, and is pivotally connected with the support base 102 about a pivot axis 124. For example, the rotary platform 104 may be pivotally connected with the bearing portion 110 of the support base 102 about the pivot axis 124, so that the rotary platform 104 is rotatable relative to the support base 102 above the bearing portion 110. The pivot axis 124 vertically passes through the rotary platform 104, and can extend along a vertical direction or slightly inclined relative to the vertical direction (e.g., at an angle between about 10 and about 15 degrees relative to the vertical direction, such as 13 degrees).

The child seat 106 is connected with the rotary platform 104, and can be comprised of a rigid shell body 125, e.g., made of a plastic material. The child seat 106 can have an interior adapted to receive a child and is provided with a restraint harness (not shown) for limiting displacement of a child sitting thereon. The child seat 106 and the rotary platform 104 are thereby rotatable in unison as a seat unit 126 about the pivot axis 124 relative to the support base 102 between a plurality of positions including a forward facing position (shown in FIG. 1), a rearward facing position (shown in FIG. 2) and a sideways facing position (shown in FIG. 3). The forward facing position is turned 180 degrees from the rearward facing position, and the sideways facing position is turned approximately 90 degrees from either of the forward and rearward facing position.

Referring to FIG. 1, a backrest portion 106B of the child seat 106 can be positioned adjacent to the upper part 108A of the anchoring portion 108 in the forward facing position, such that a child sitting on the child seat 106 in the forward facing position would face a side opposite to that of the upper part 108A of the anchoring portion 108. The child safety seat 100 may be installed on a vehicle seat with the rotary platform 104 and the child seat 106 in the forward facing position so as to receive a child of a larger size facing a front of the vehicle.

Referring to FIG. 2, a front of the child seat 106 can be positioned adjacent to the upper part 108A of the anchoring portion 108 in the rearward facing position, such that a child sitting on the child seat 106 in the rearward facing position would face the upper part 108A of the anchoring portion 108. The child safety seat 100 may be installed on a vehicle seat with the rotary platform 104 and the child seat 106 in the rearward facing position so as to receive a child of a smaller size facing a rear of the vehicle.

Referring to FIG. 3, the front of the child seat 106 can be turned to a right side (as shown) or a left side of the support base 102 in the sideways facing position for facilitating access to the interior of the child seat 106. While the support base 102 remains attached to a vehicle seat, the rotary platform 104 and the child seat 106 can be rotated to the sideways facing position to face a vehicle door, thereby facilitating placement of a child on the child seat 106 or removal of the child from the child seat 106.

According to an embodiment, the child seat 106 can be slidably connected with the rotary platform 104 for back and forth movement. For example, referring to FIG. 4, the shell body 123 of the rotary platform 104 can include a left and a right sidewall 128 on which the child seat 106 can be slidably supported. Accordingly, the child seat 106 can slide relative to the rotary platform 104 and the support base 102 for recline adjustment independently to the rotational adjustment about the pivot axis 124 described previously. The recline adjustment may be conducted while the child seat 106 is in the forward or rearward facing position.

Referring to FIGS. 1-4, the support base 102 can include two flange portions 130 and 132 vertically spaced apart from each other, the flange portion 132 being located below the flange portion 130. According to an embodiment, the two flange portions 130 and 132 can be fixedly connected with the upper part 108A of the anchoring portion 108 above the bearing portion 110. Examples of materials for the flange portions 130 and 132 can include, without limitation, steel, rigid plastics, and the like. According to some embodiments, the flange portion 132 may be made of rigid plastics and the flange portion 130 may be made of steel, which may provide desirable strength in the forward facing position. As more space may be available in the lower position between the rotary platform 104 and the anchoring portion 108, the flange portion 132 may have a larger cross section (not shown) for additional strength. Each of the two flange portions 130 and 132 can have a curved shape that extends transversally from a left to a right side of the support base 102. For example, the curved shape of each of the two flange portions 130 and 132 may have a center of curvature adjacent to the pivot axis 124 of the seat unit 126 comprised of the rotary platform 104 and the child seat 106.

When the seat unit 126 comprised of the child seat 106 and the rotary platform 104 is in the forward facing position, the seat unit 126 can be engaged with the flange portion 130 which is located adjacent to a shoulder support region 134 of the child seat 106. When the seat unit 126 is turned to the rearward facing position, the seat unit 126 can be disengaged from the flange portion 130 and engaged with the flange portion 132 which is located below a leg resting region 136 of the child seat 106. When car collision occurs, the engagement with the flange portions 130 and 132 described above can facilitate transfer of collision energy from the seat unit 126 through the support base 102 to a vehicle seat. Accordingly, the child safety seat 100 can be safer in use.

A plurality of flange portions can be provided on the seat unit 126 to effect the aforementioned engagement of the seat unit 126 with the flange portions 130 and 132 of the support base 102. More specifically, the seat unit 126 comprised of the child seat 106 and the rotary platform 104 can have a front portion having a flange portion 138, and a rear portion having two flange portions 140 and 142 vertically spaced apart from each other, the flange portion 140 being above the flange portion 142. Examples of materials for the flange portions 138, 140 and 142 can include, without limitation, steel, rigid plastics, and the like. According to some embodiments, the flange portions 138 and 142 may be made of rigid plastics and the flange portion 140 may be made of steel, which may provide desirable strength in the forward facing position. As more space may be available in the lower position between the rotary platform 104 and the anchoring portion 108, each of the flange portions 138 and 142 may have a larger cross section (not shown) for additional strength. Each of the flange portions 138, 140 and 142 can have a curved shape that extends transversally from a left to a right side of the seat unit 126. The curved shape of each of the flange portions 138, 140 and 142 may have a center of curvature adjacent to the pivot axis 124 of the seat unit 126.

According to an example of construction, the flange portions 138, 140 and 142 can be fixedly connected with the rotary platform 104 of the seat unit 126: the flange portion 138 can be fixedly connected with a front portion of the rotary platform 104 below the leg resting region 136 of the child seat 106, and the flange portions 140 and 142 can be fixedly connected with a rear portion of the rotary platform 104. Accordingly, the engagement of the seat unit 126 with the flange portions 130 and 132 of the support base 102 in the forward and rearward facing positions as described previously would not be affected by a recline adjustment of the child seat 106 relative to the rotary platform 104.

In the forward facing position, the flange portion 140 at the rear of the rotary platform 104 can be engaged with an underside of the flange portion 130 on the support base 102 adjacent to the shoulder support region 134 of the child seat 106, and the flange portion 138 at the front of the rotary platform 104 can be disengaged from the flange portion 132 on the support base 102. The flange portion 140 of the rotary platform 104 can move and come into engagement with the flange portion 130 of the support base 102 as the seat unit 126 rotates toward the forward facing position. In particular, the rotation of the seat unit 126 toward the forward facing position can cause the flange portion 140 to travel generally parallel to the flange portion 130 until the flange portion 140 is positioned at the underside of the flange portion 130, thereby achieving the engagement between the flange portions 130 and 140.

In addition to the engagement between the flange portion 140 of the rotary platform 104 and the flange portion 130 of the support base 102, the flange portion 142 at the rear of the rotary platform 104 can also be engaged with the flange portion 132 of the support base 102 in the forward facing position. In other words, the seat unit 126 comprised of the child seat 106 and the rotary platform 104 can be engaged with both the flange portions 130 and 132 of the support base 102 in the forward facing position. While the seat unit 126 rotates toward the forward facing position, the flange portion 142 on the rotary platform 104 can travel generally parallel to the flange portion 132 until it engages with an underside of the flange portion 132 on the support base 102, the engagement of the flange portion 142 with the flange portion 132 occurring before the flange portion 140 of the rotary platform 104 engages with the flange portion 130 of the support base 102. The initial engagement between the flange portions 132 and 142 can facilitate alignment and engagement of the flange portion 140 of the rotary platform 104 with the flange portion 130 of the support base 102.

In the rearward facing position, the flange portion 138 at the front of the rotary platform 104 can be engaged with an underside of the flange portion 132 on the support base 102 below the leg resting region 136 of the child seat 106, and the flange portion 140 at the rear of the rotary platform 104 can be disengaged from the flange portion 130 of the support base 102. The flange portion 138 of the rotary platform 104 can move and come into engagement with the flange portion 132 of the support base 102 as the seat unit 126 rotates toward the rearward facing position. In particular, the rotation of the seat unit 126 toward the rearward facing position can cause the flange portion 138 to travel generally parallel to the flange portion 132 until the flange portion 138 is positioned at the underside of the flange portion 132, thereby achieving the engagement between the flange portions 132 and 138. Moreover, the flange portion 140 at the rear of the rotary platform 104 can also travel generally parallel to the flange portion 130 of the support base 102 for disengaging from the flange portion 130.

Figure 5:
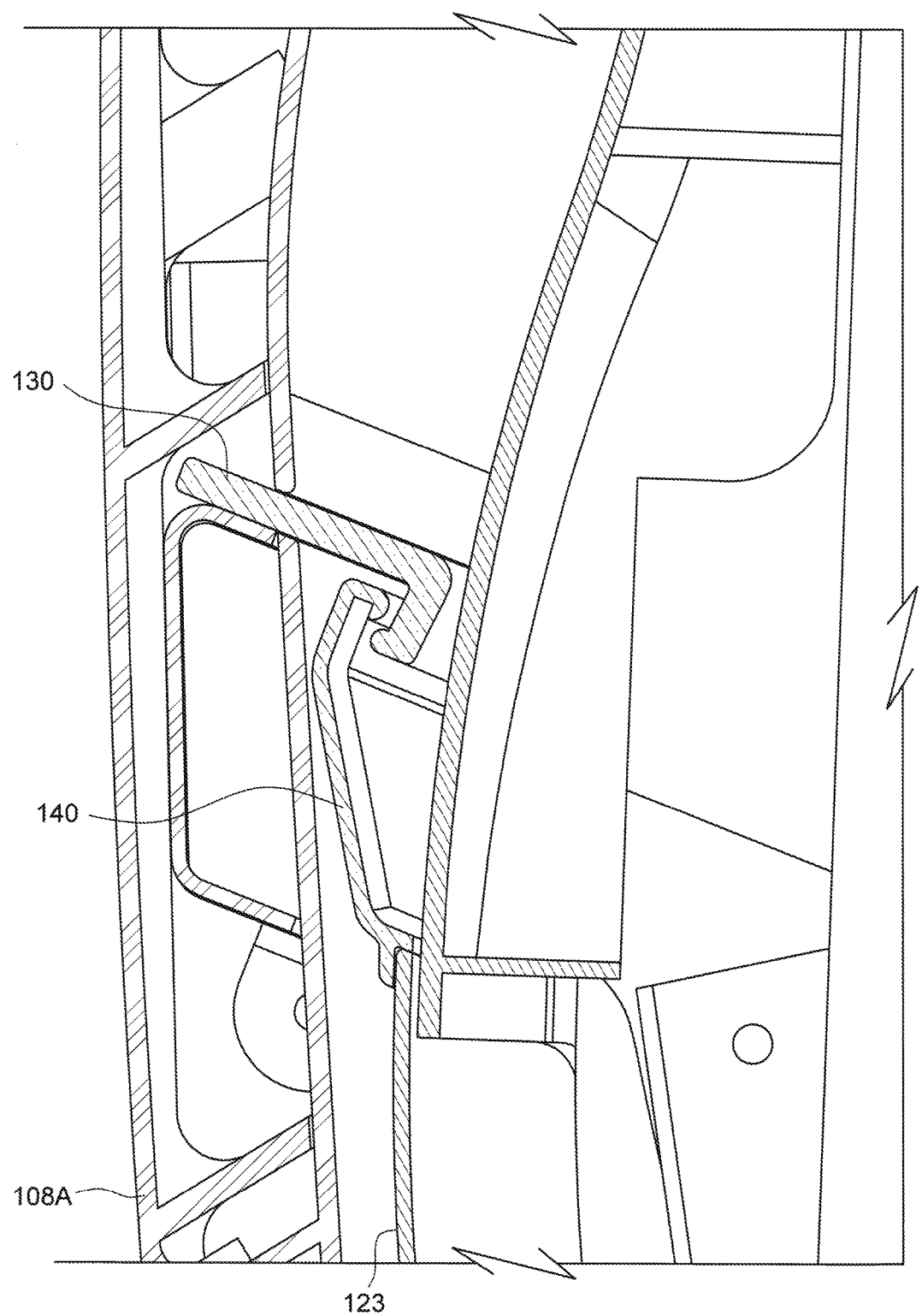
FIG. 5 is a cross-sectional view illustrating some examples of cross-sectional shapes for mutually engaging flange portions provided on a support base and a rotary platform of the child safety seat.

FIG. 5 is a cross-sectional view illustrating examples of cross-sectional shapes for the flange portion 130 of the support base 102 and the flange portion 140 of the rotary platform 104. Referring to FIG. 5, the flange portion 130 on the support base 102 can have a cross-section including a hook shape. Correspondingly, the flange portion 140 on the rotary platform 104 can have a cross-section including a hook shape that can complementarily mate with the hook shape of the flange portion 130 on the support base 102. The flange portion 132 on the support base 102 can have a cross-section including a hook shape like the flange portion 130, and each of the flange portions 138 and 142 on the rotary platform 104 can have a cross-section including a hook shape similar to that of the flange portion 140 which can complementarily mate with the hook shape of the flange portion 132 on the support base 102. The engagement between these hook shapes can transmit horizontal and vertical displacements of the seat unit 126 induced by car collision to the support base 102.

Figure 6:
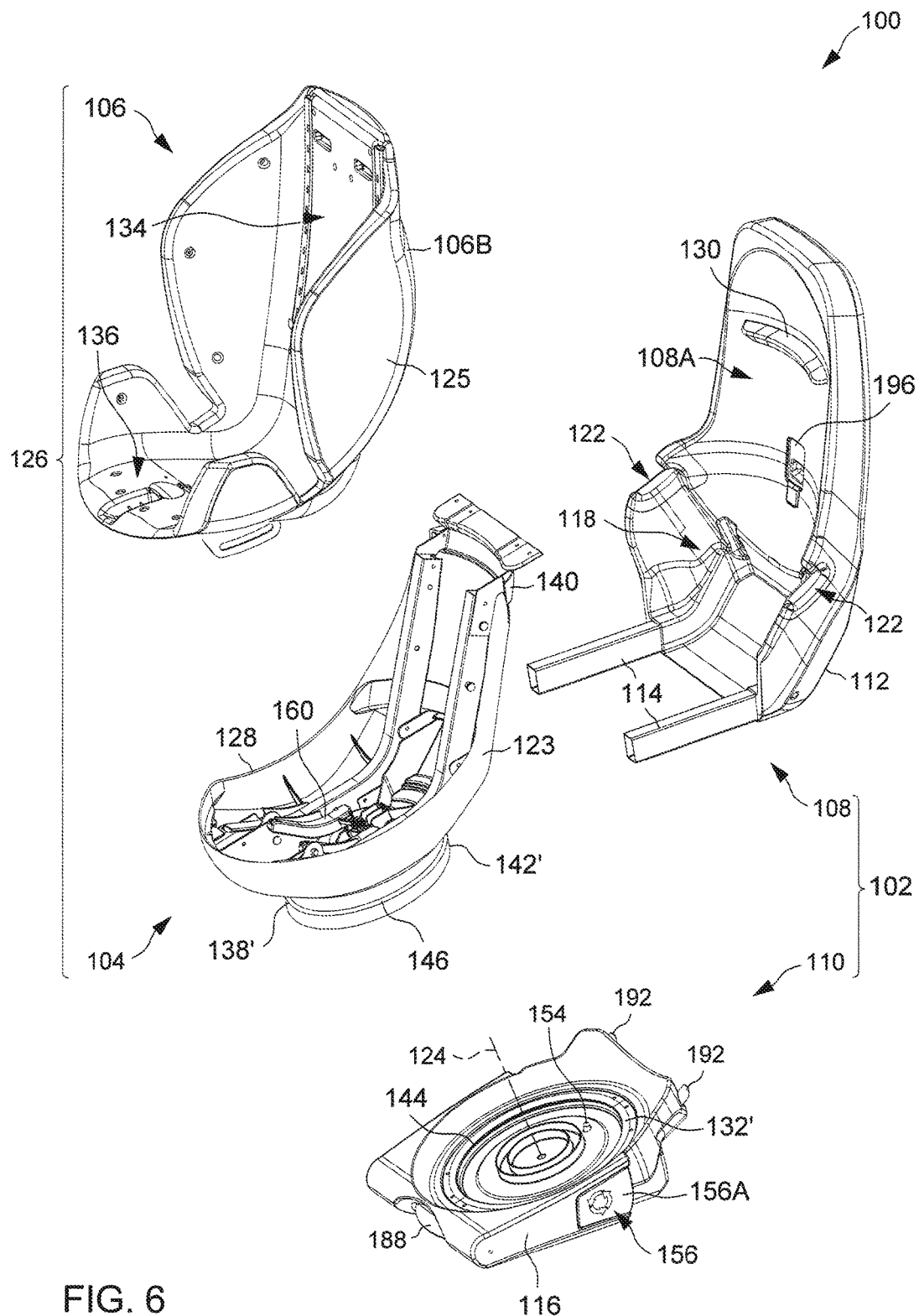
FIG. 6 is an exploded view illustrating a variant construction of the child safety seat.

FIG. 6 is a schematic view illustrating another example of construction for flange portions provided on the support base 102 and the rotary platform 104 to effect the engagement of the seat unit 126 with the support base 102 in the forward and rearward facing positions. In the embodiment of FIG. 6, the upper part 108A of the anchoring portion 108 rising above the bearing portion 110 can be fixedly connected with the flange portion 130 as described previously, but the other flange portion 132 previously provided on the anchoring portion 108 is replaced with a flange portion 132' that is fixedly connected with the bearing portion 110 below the flange portion 130. More specifically, the flange portion 132' can be provided as a part of a circular flange 144 fixedly connected with the bearing portion 110, the circular flange 144 being centered on and extending around the pivot axis 124 of the rotary platform 104.

Referring again to FIG. 6, the rotary platform 104 can include the flange portion 140 at its rear as previously described, and a circular flange 146 disposed below the flange portion 140. The circular flange 146 is fixedly connected with the rotary platform 104 (e.g., the shell body 123 thereof), and is centered on and extends around the pivot axis 124 of the rotary platform 104. This circular flange 146 can include two flange portions 138' and 142' connected with each other that are respectively located at the front and the rear of the rotary platform 104. The two flange portions 138' and 142' of the circular flange 146 can substitute for the two flange portions 138 and 142 illustrated in the previous embodiment. The circular flange 146 of the rotary platform 104 can be slidably engaged with an underside of the circular flange 144 on the bearing portion 110 when the rotary platform 104 is pivotally assembled with the bearing portion 110 of the support base 102. Accordingly, the engagement between the two circular flanges 144 and 146 can transfer collision energy from the seat unit 126 to the support base 102 for any rotational position of the seat unit 126 relative to the support base 102, including the forward and rearward facing positions. According to some embodiments, any of the circular flanges 144 and 146 and flange portions 132', 138' and 142' may have a cross-section including a hook shape as described previously.

Figure 7:
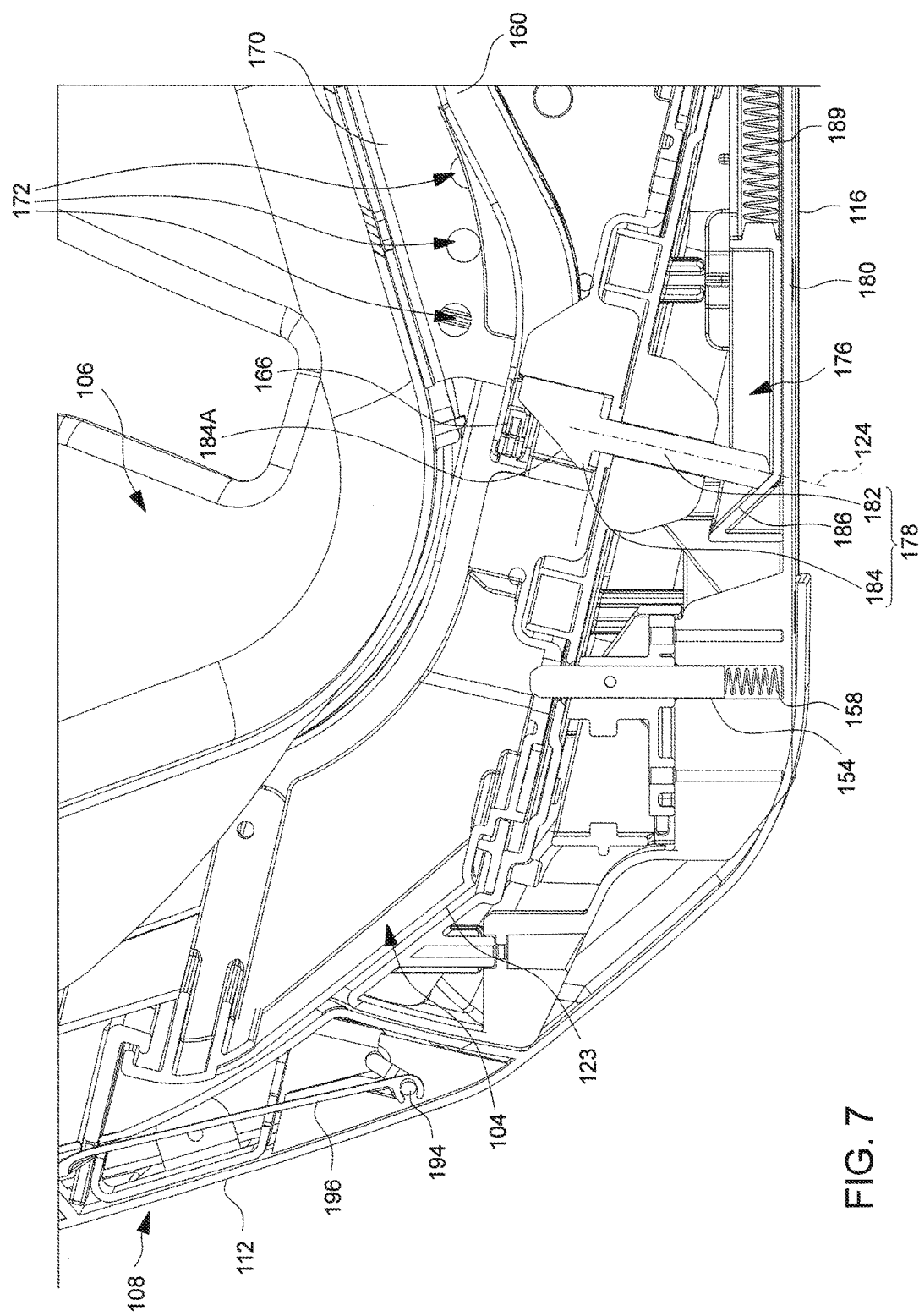
FIG. 7 is a cross-sectional view taken in a section plane extending from a rear toward a front of the child safety seat and passing through a pivot axis of a rotary platform that illustrates some construction details for locking the rotary platform and a child seat of the child safety seat in position.
Figure 8:
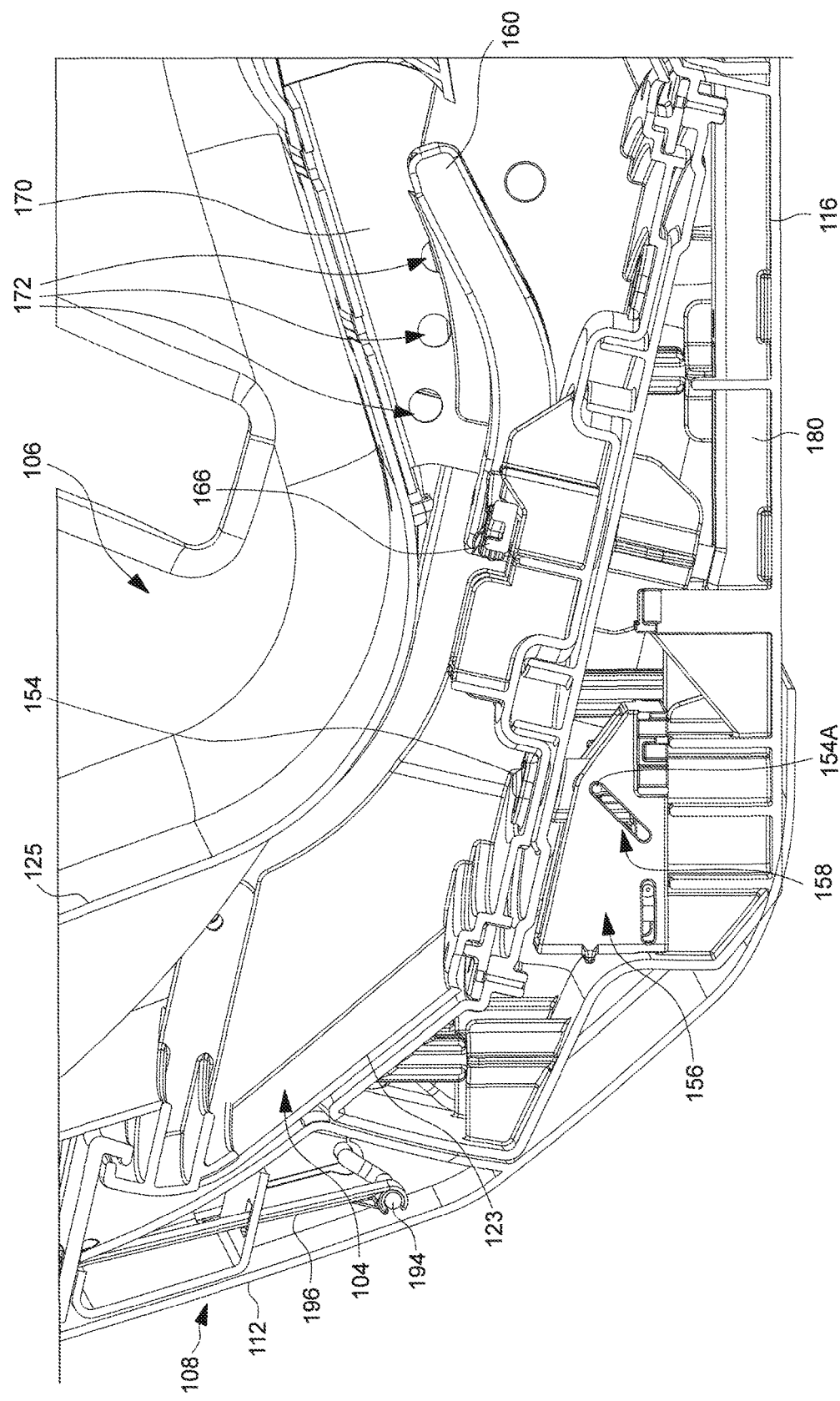
FIG. 8 is a cross-sectional view taken in a section plane parallel to the section plane of FIG. 7 that illustrates some construction details for locking the rotary platform and the child seat of the child safety seat in position.
Figure 9:
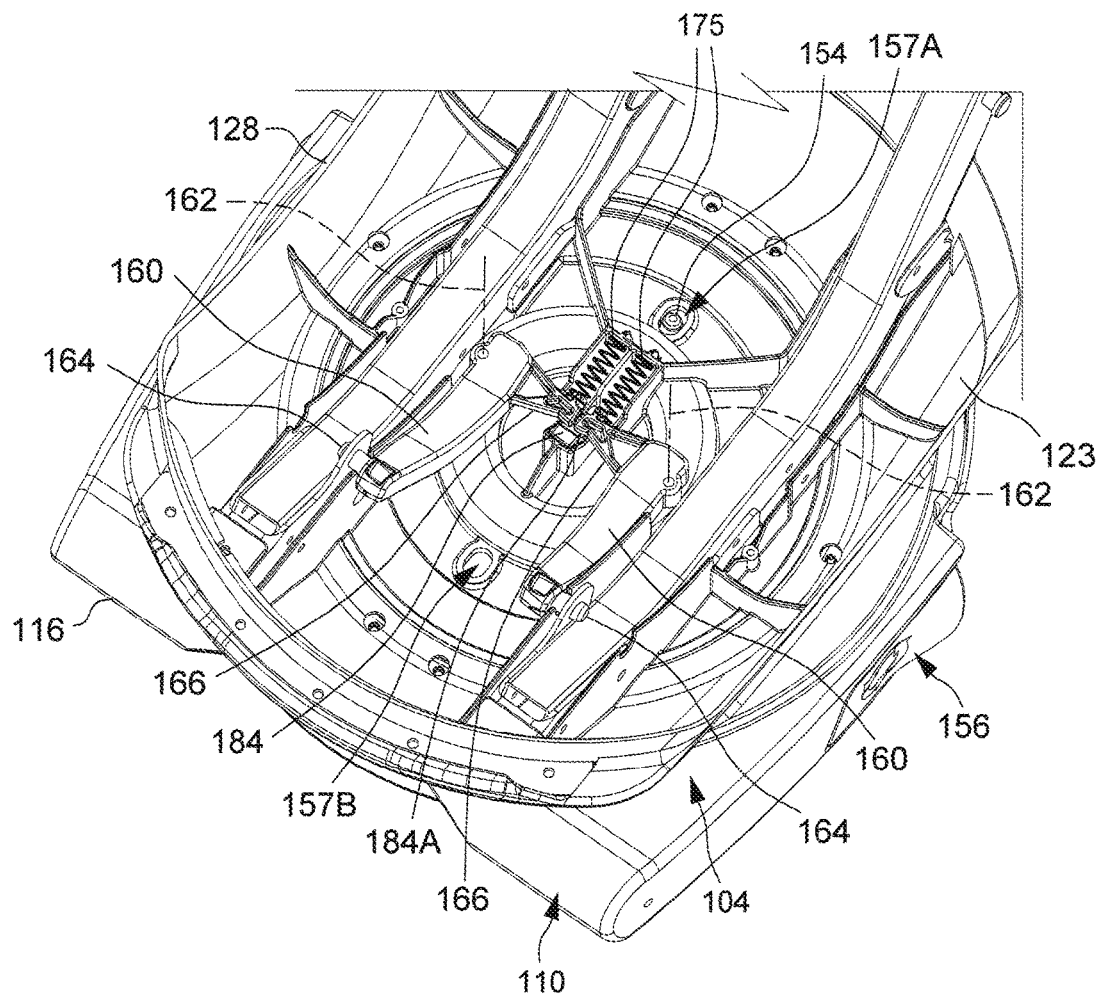
FIG. 9 is a perspective view illustrating construction details inside the rotary platform.
Figure 10:
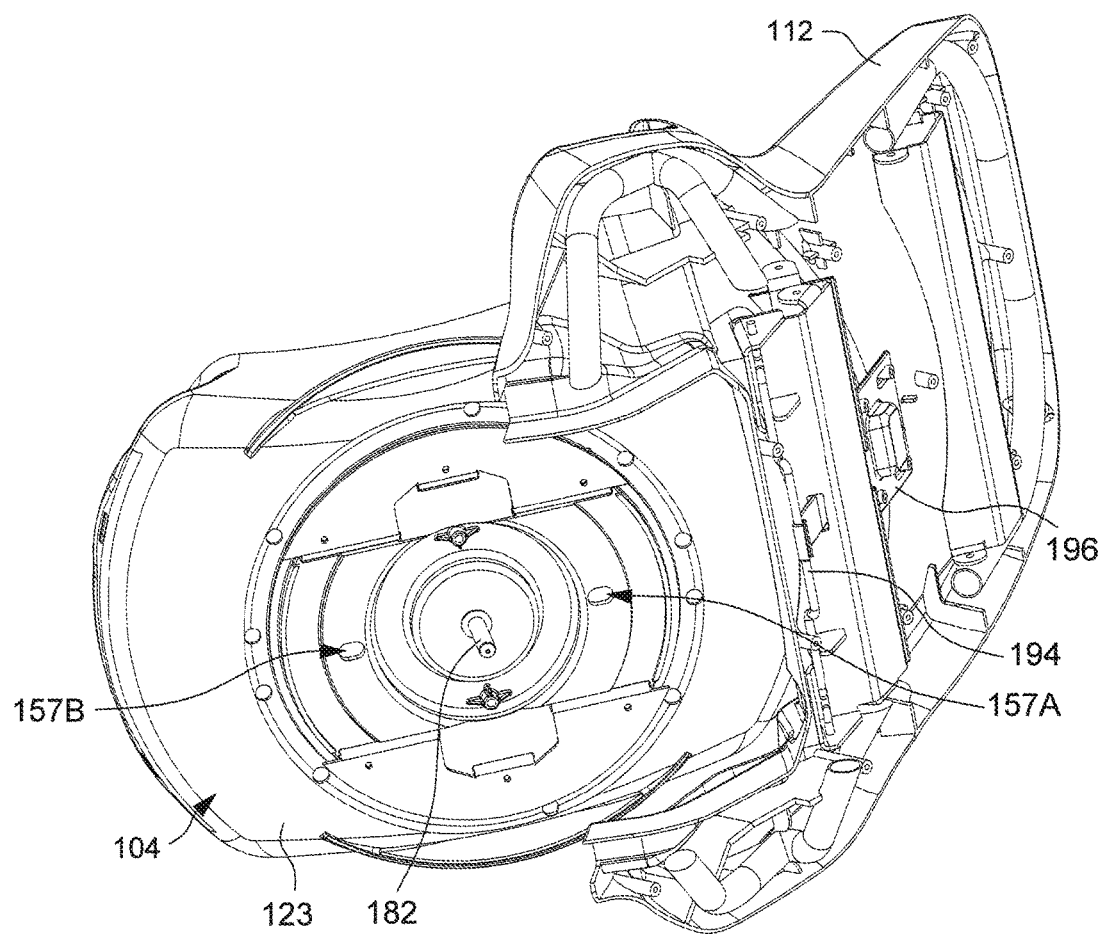
FIG. 10 is a perspective view showing a bottom of the rotary platform and further construction details inside the anchoring portion.

FIGS. 7-10 are various schematic views illustrating further construction details for locking the rotary platform 104 and the child seat 106 in position. In particular, FIGS. 7 and 8 are two cross-sectional views taken in two parallel section planes extending from a rear toward a front of the child safety seat, the section plane of FIG. 7 passing through the pivot axis 124 of the rotary platform 104. FIG. 9 is a perspective view illustrating construction details inside the rotary platform 104, and FIG. 10 is a perspective view illustrating some portion of the child safety seat 100 but omitting the bearing portion 110 and a part of the shell body 112 of the anchoring portion 108 to better show a bottom of the rotary platform 104 and further construction details inside the anchoring portion 108. Referring to FIGS. 7-10, the bearing portion 110 can include a seat rotation lock 154 and a release actuator 156 connected with each other. According to an example of construction, the seat rotation lock 154 may be formed as a pin having a lateral protrusion 154A projecting sideways. The seat rotation lock 154 can be assembled with the shell body 116 of the bearing portion 110 for upward and downward sliding movement at a location eccentric from the pivot axis 124. The seat rotation lock 154 can thereby slide upward for engaging with the rotary platform 104 to rotationally lock the seat unit 126 comprised of the rotary platform 104 and the child seat 106 in any of the forward and rearward facing positions, and slide downward to disengage from the rotary platform 104 for rotation of the rotary platform 104 and the child seat 106 about the pivot axis 124. For example, the shell body 123 of the rotary platform 104 may include two openings 157A and 157B, the forward facing position can be locked by having the seat rotation lock 154 engaged with the opening 157A, and the rearward facing position can be locked by having the seat rotation lock 154 engaged with the opening 157B. The seat rotation lock 154 may further be connected with a spring 158 operable to bias the seat rotation lock 154 to the locking state engaged with the rotary platform 104.

The release actuator 156 can be assembled with the shell body 116 of the bearing portion 110 for back and forth movements. According to an example of construction, the release actuator 156 can be a single part having an inner portion provided with a drive slot 158 inclined an angle, and an outer portion 156A exposed outward for operation. For example, the outer portion 156A of the release actuator 156 may be exposed on a left or right side of the bearing portion 110. The release actuator 156 can be movably linked to the seat rotation lock 154 by having the lateral protrusion 154A of the seat rotation lock 154 slidably received through the drive slot 158 of the release actuator 156.

When a caregiver operates the release actuator 156, the sliding displacement of the release actuator 156 can urge the seat rotation lock 154 to move from the locking state to the unlocking state for rotation of the rotary platform 104 and the child seat 106 relative to the support base 102. Once the rotary platform 104 and the child seat 106 reaches the forward or rearward facing position, the release actuator 156 can be released, and the spring 158 can urge the seat rotation lock 154 to slide upward and engage with the rotary platform 104 for rotationally locking the seat unit 126 in position.

In conjunction with FIGS. 7 and 8, FIGS. 9 and 10 also illustrate construction details of a mechanism for locking the child seat 106 with the rotary platform 104 in a desired recline position. Referring to FIGS. 7-10, the rotary platform 104 can include two recline locks 160 that are disposed under the child seat 106. The two recline locks 160 can have a same construction, and can be symmetrically disposed relative to a central axis of the rotary platform 104 extending from a rear to a front of the rotary platform 104. According to an example of construction, each recline lock 160 can be formed as a single part having an elongate shape including a latching protrusion 164 that projects sideways outward at an end of the recline lock 160, and a tab 166 that projects inward. Each recline lock 160 can be pivotally assembled with the shell body 123 of the rotary platform 104 about a pivot axis 162 extending generally vertically. This assembly allows the recline locks 160 to move along with the rotary platform 104 during rotation of the child seat 106 and the rotary platform 104 about the pivot axis 124 relative to the support base 102.

Each recline lock 160 can be movable between a locking state where the latching protrusion 164 engages with the child seat 106 for locking the child seat 106 in position with respect to the rotary platform 104, and an unlocking state where the latching protrusion 164 disengages from the child seat 106 for recline adjustment of the child seat 106 relative to the rotary platform 104. According to an example of construction, each recline lock 160 can respectively engage with a corresponding plate 170 (better shown in FIG. 8) fixedly connected with the child seat 106 for locking the child seat 106 in position. The plate 170 can have a plurality of holes 172 respectively associated with different recline positions of the child seat 106 on the rotary platform 104, and the latching protrusion 164 of the recline lock 160 can engage with any of the holes 172 to lock the child seat 106 in a desired recline position. Each recline lock 160 may be connected with a spring 175, which can bias the recline lock 160 to the locking state.

Referring to FIG. 7, the two recline locks 160 may be further connected with a release mechanism 176, which is operable to urge the two recline locks 160 to move from the locking state to the unlocking state. The release mechanism 176 can include a driving part 178 and a release actuator 180. The driving part 178 can be formed as a single part including a stem 182 and a head portion 184. The driving part 178 can be assembled with the rotary platform 104 coaxial to the pivot axis 124 with the stem 182 extending outside the rotary platform 104 at a bottom thereof and the head portion 184 disposed adjacent to the tab 166 of each recline lock 160. This assembly allows the driving part 178 to slide along the pivot axis 124 relative to the rotary platform 104 while rotationally coupling the driving part 178 to the rotary platform 104. In other words, the driving part 178 rotates along with the rotary platform 104 about the pivot axis 124 during rotation of the child seat 106 and the rotary platform 104 relative to the support base 102.

The release actuator 180 can be formed as a single part including a ramp 186 and an actuating portion 188 (better shown in FIGS. 1-4). The ramp 186 can be adjacent to an end of the stem 182 projecting from a bottom of the rotary platform 104, and the actuating portion 188 can be exposed on the bearing portion 112 for operation. The release actuator 180 can be assembled with the bearing portion 112 for back and forth sliding movements with the ramp 186 in sliding contact with the stem 182 of the driving part 178. This assembly allows rotation of the driving part 178 about the pivot axis 124 relative to the release actuator 180 while maintaining the sliding contact between the driving part 178 and the release actuator 180.

Referring to FIGS. 1-3 and 7, when a caregiver operates the release actuator 180, for example by pulling the actuating portion 188 of the release actuator 180, the sliding displacement of the release actuator 180 can urge the driving part 178 to slide upward (i.e., toward the interior of the rotary platform 104) along the pivot axis 124 relative to the rotary platform 104 owing to the sliding contact between the ramp 186 and the stem 182. As a result, the head portion 184 of the driving part 178 can push against the tab 166 of each recline lock 160, which urges the two recline locks 160 to respectively rotate and disengage from the child seat 106 for recline adjustment. According to an example of construction, the head portion 184 of the driving part 178 can have a ramp surface 184A, which can contact and push against the tabs 166 for urging the two recline locks 160 to rotate from the locking state to the unlocking state. The child seat 106 can be thereby unlocked, and then slide forward or rearward relative to the rotary platform 104 and the support base 102 for recline adjustment. Once the child seat 106 has reached a desired recline position, the caregiver can release the release actuator 180, and the recline locks 160 can recover the locking state under the biasing action of the springs 175. Referring to FIG. 7, a spring 189 may be coupled with the release actuator 180 for applying a biasing force that can assist the release actuator 180 to recover its initial position.

In the child safety seat 100 described herein, the support base 102 can remain stationary during adjustment of the child seat 106. Since the release actuator 180 is provided on the support base 102, the child seat 106 can be conveniently adjusted to a desirable recline position in any rotational positions of the seat unit 126, such as the forward, rearward, or sideways facing positions.

Figure 11:
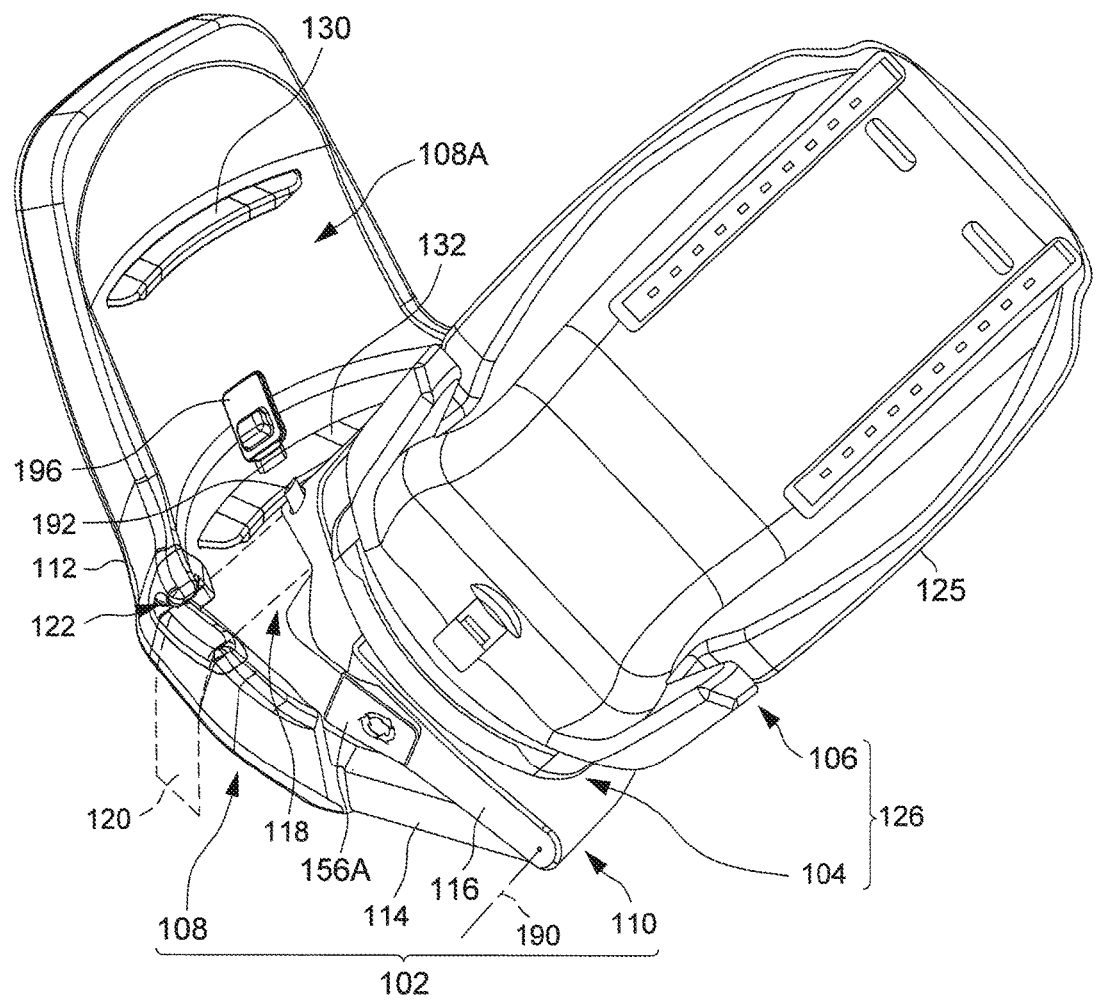
FIG. 11 is a perspective view illustrating a support base of the child safety seat comprised of an anchoring portion and a bearing portion suitable for use as a belt restraining part rotatable between a clamping and a release state.

According to some embodiment, the anchoring portion 108 and the bearing portion 110 may be movably connected with each other so as to provide a further adjustment feature in the support base 102. In conjunction with FIGS. 1-4, FIG. 11 is a perspective view illustrating a construction in which the bearing portion 110 can be pivotally connected with the anchoring portion 108 about a pivot axis 190. Referring to FIGS. 4 and 11, the bearing portion 110 may be exemplary connected pivotally with the two rods 114 of the anchoring portion 108 about the pivot axis 190, which extends transversally from a left to a right side of the support base 102. The bearing portion 110 can be thereby configured as a belt retraining member rotatable relative to the anchoring portion 108. More specifically, the bearing portion 110 can rotate about the pivot axis 190 relative to the anchoring portion 108 between a clamping state for restraining a fastening belt 120 (better shown in FIGS. 1-3) in a region of the belt path 118 between the anchoring portion 108 and the bearing portion 110, and a release state for facilitating installation or removal of the fastening belt 120. When the bearing portion 110 is in the clamping state, the bearing portion 110 can press against the fastening belt 120 passing through the two guide slots 122 of the anchoring portion 108, which convolutes the fastening belt 120 and provides tension in the fastening belt 120 for a secure attachment of the child safety seat 100. When the bearing portion 110 is in the release state, the bearing portion 110 is rotated upward to facilitate access to the belt path 118 for installation or removal of the fastening belt 120. The child seat 106, the rotary platform 104 and the bearing portion 110 are movable in unison relative to the anchoring portion 108 during movement of the bearing portion 110 between the clamping state and the release state. With this construction, the fastening belt 120 can be fixedly secured below the bearing portion 110 of the support base 102, such that the fastening belt 120 would not interfere in the positional adjustment of the child seat 106, e.g., when the child seat 106 is rotated between the forward, rearward and sideways facing positions, or during recline adjustment.

Referring to FIGS. 4 and 11, the bearing portion 110 can include one or more latch 192 (two latches 192 are exemplary shown) for locking the bearing portion 110 in the clamping state. Each latch 192 can be slidably assembled with the shell body 116 of the bearing portion 110 at a rear thereof. The latch 192 can slide relative to the bearing portion 110 to project outward and engage with the anchoring portion 108 for locking the bearing portion 110 in the clamping state. Moreover, the latch 192 can retract toward the interior of the bearing portion 110 and disengage from the anchoring portion 108 for movement of the bearing portion 110 relative to the anchoring portion 108 between the clamping state and the release state. Each latch 192 may be coupled with a spring (not shown) disposed inside the bearing portion 110 that can bias the latch 192 to the locking state.

A release mechanism may be provided on the anchoring portion 108 to switch the latch 192 from the locking to the unlocking state. Referring to FIGS. 10 and 11, this release mechanism may exemplary include a kicking part 194 and a release actuator 196. The kicking part 194 may be pivotally connected with the shell body 112 of the anchoring portion 108 about a pivot axis extending transversally. The release actuator 196 can be assembled with the shell body 112 of the anchoring portion 108 for upward and downward sliding movement, and can be pivotally connected with the kicking part 194 at a location eccentric from the pivot axis of the kicking part 194. While the latch 192 is in the locking state engaged with the anchoring portion 108, the release actuator 196 is operable to urge the kicking part 194 to rotate and push against the latch 192. As a result, the latch 192 can be urged to disengage from the anchoring portion 108 and thereby unlock the bearing portion 110.

Advantages of the child safety seats described herein include the ability to rotate a child seat relative to a support base for convenient placement of a child on the child seat, and facilitate the transfer of collision energy from the child seat through the support base to a vehicle seat. Accordingly, the child safety seat can be safer in use. In addition to the rotational displacement, the child safety seat allows recline adjustment of the child seat for comfortable sitting of a child.

Realizations of the child safety seats have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat comprising:
   a support base suitable for placement on a vehicle seat, the support base including an anchoring portion and a bearing portion connected with each other, the anchoring portion having a belt path for passage of a fastening belt to attach the child safety seat on a vehicle seat;
   a rotary platform pivotally connected with the bearing portion of the support base about a pivot axis; and
   a child seat connected with the rotary platform, wherein the child seat, the rotary platform and the bearing portion are movable in unison relative to the anchoring portion, and the child seat and the rotary platform are rotatable in unison as a seat unit relative to the support base between a plurality of positions including a forward facing position, a rearward facing position and a sideways facing position;

wherein the support base further includes a first and a second flange portion vertically spaced apart from each other, the second flange portion being located below the first flange portion and each of the first and second flange portions having a curved shape that extends transversally from a left to a right side of the support base, the seat unit comprised of the child seat and the rotary platform being respectively engaged with the first and second flange portions in the forward facing position with the first flange portion located adjacent to a shoulder support region of the child seat, and the seat unit being engaged with the second flange portion and disengaged from the first flange portion in the rearward facing position.

2. The child safety seat according to claim 1, wherein the bearing portion is movable relative to the anchoring portion between a clamping state for restraining a fastening belt in a region of the belt path between the anchoring portion and the bearing portion, and a release state for facilitating installation or removal of the fastening belt.

3. The child safety seat according to claim 1, wherein the bearing portion is pivotally connected with the anchoring portion.

4. The child safety seat according to claim 1, wherein the curved shape of each of the first and second flange portions has a center of curvature adjacent to the pivot axis.

5. The child safety seat according to claim 1, wherein at least one of the first and second flange portions has a cross-section including a hook shape.

6. The child safety seat according to claim 1, wherein the anchoring portion extends above the bearing portion and is fixedly connected with the first and second flange portions, the first and second flange portions being located above the bearing portion.

7. The child safety seat according to claim 1, wherein the anchoring portion extends above the bearing portion and is fixedly connected with the first flange portion, and the second flange portion is fixedly connected with the bearing portion.

8. The child safety seat according to claim 7, wherein the second flange portion is a flange portion of a circular flange that extends around the pivot axis.

9. The child safety seat according to claim 1, wherein the seat unit comprised of the child seat and the rotary platform has a front portion and a rear portion, the front portion having a third flange portion, the rear portion having a fourth and a fifth flange portion vertically spaced apart from each other, the fourth and fifth flange portions being respectively engaged with the first and second flange portions in the forward facing position, and the third flange portion being engaged with the second flange portion and the fourth flange portion disengaged from the first flange portion in the rearward facing position.

10. The child safety seat according to claim 9, wherein the third, fourth and fifth flange portions are fixedly connected with the rotary platform.

11. The child safety seat according to claim 9, wherein the third and fifth flange portions are two flange portions of a circular flange that extends around the pivot axis.

12. The child safety seat according to claim 1, wherein the bearing portion includes a seat rotation lock and a release actuator, the seat rotation lock being operable to lock the child seat and the rotary platform in the forward facing position and the rearward facing position, and the release actuator being operable to urge the seat rotation lock to move to an unlocking state for rotation of the child seat and the rotary platform relative to the support base.

13. The child safety seat according to claim 1, wherein the child seat is movably connected with the rotary platform, the child seat being slidable relative to the rotary platform and the support base for recline adjustment.

14. The child safety seat according to claim 13, wherein the rotary platform includes a recline lock movable between a locking and an unlocking state, the recline lock being engaged with the child seat in the locking state for locking the child seat in position with respect to the rotary platform, and the recline lock being disengaged from the child seat in the unlocking state for recline adjustment of the child seat relative to the rotary platform, the recline lock being movable along with the rotary platform during rotation of the child seat and the rotary platform relative to the support base.

15. The child safety seat according to claim 14, wherein the recline lock is pivotally connected with the rotary platform.

16. The child safety seat according to claim 14, further including a release mechanism operable to urge the recline lock to move from the locking state to the unlocking state, the release mechanism including:
a driving part assembled with the rotary platform, the driving part being rotatable with the rotary platform about the pivot axis and slidable along the pivot axis relative to the rotary platform; and
a release actuator assembled with the bearing portion, the release actuator being operable to urge the driving part to slide along the pivot axis toward an interior of the rotary platform for pushing the recline lock to move from the locking state to the unlocking state.

17. A child safety seat comprising:
a support base suitable for placement on a vehicle seat, the support base including a first and a second flange portion vertically spaced apart from each other, the second flange portion being located below the first flange portion;
a rotary platform pivotally connected with the support base about a pivot axis; and
a child seat connected with the rotary platform, the child seat and the rotary platform being rotatable in unison as a rotatable seat unit relative to the support base between a plurality of positions including a forward facing position, a rearward facing position and a sideways facing position;
wherein the rotatable seat unit comprised of the child seat and the rotary platform is engaged with the first flange portion and the second flange portion in the forward facing position with the first flange portion located adjacent to a shoulder support region of the child seat, and the rotatable seat unit is engaged with the second flange portion and disengaged from the first flange portion in the rearward facing position.

18. The child safety seat according to claim 17, wherein each of the first and second flange portions has a curved shape that extends transversally from a left to a right side of the support base.

19. The child safety seat according to claim 18, wherein the curved shape of each of the first and second flange portions has a center of curvature adjacent to the pivot axis.

20. The child safety seat according to claim 17, wherein at least one of the first and second flange portion has a cross-section including a hook shape.

21. The child safety seat according to claim 17, wherein the support base includes an anchoring portion and a bearing portion movably connected with each other, the anchoring portion extending above the bearing portion, the rotary platform being pivotally connected with the bearing portion, and the child seat, the rotary platform and the bearing portion being movable in unison relative to the anchoring portion.

22. The child safety seat according to claim 21, wherein the first and second flange portions are fixedly connected with the anchoring portion above the bearing portion.

23. The child safety seat according to claim 21, wherein the first flange portion is fixedly connected with the anchoring portion, and the second flange portion is fixedly connected with the bearing portion.

24. The child safety seat according to claim 23, wherein the second flange portion is a flange portion of a circular flange that extends around the pivot axis.

25. The child safety seat according to claim 17, wherein the rotatable seat unit comprised of the child seat and the rotary platform has a front portion and a rear portion, the front portion having a third flange portion, the rear portion having a fourth and a fifth flange portion vertically spaced apart from each other, the fourth and fifth flange portions being respectively engaged with the first and second flange portions in the forward facing position, and the third flange portion being engaged with the second flange portion and the fourth flange portion disengaged from the first flange portion in the rearward facing position.

26. The child safety seat according to claim 25, wherein the third, fourth and fifth flange portions are fixedly connected with the rotary platform.

27. The child safety seat according to claim 25, wherein the third and fifth flange portions are two flange portions of a circular flange that extends around the pivot axis.

28. The child safety seat according to claim 25, wherein the rotatable seat unit is rotatable about the pivot axis toward the forward facing position until the fourth flange portion is positioned and engaged at an underside of the first flange portion.

* * * * *